United States Patent
Kim et al.

(10) Patent No.: US 10,279,258 B2
(45) Date of Patent: *May 7, 2019

(54) SYSTEM AND METHOD FOR COMBINING VIRTUAL UNITS IN A GAME

(71) Applicant: Electronic Arts Inc., Redwood City, CA (US)

(72) Inventors: John Kim, San Francisco, CA (US); Kevin Chanthasiriphan, San Francisco, CA (US); Joshua Forester, Santa Clara, CA (US); David McNeill, San Francisco, CA (US)

(73) Assignee: Electronic Arts Inc., Redwood City, CA (US)

(*) Notice: Subject to any disclaimer, the term of this patent is extended or adjusted under 35 U.S.C. 154(b) by 42 days.

This patent is subject to a terminal disclaimer.

(21) Appl. No.: 15/809,263

(22) Filed: Nov. 10, 2017

(65) Prior Publication Data

US 2018/0065039 A1 Mar. 8, 2018

Related U.S. Application Data

(63) Continuation of application No. 14/054,635, filed on Oct. 15, 2013, now Pat. No. 9,814,968.

(51) Int. Cl.
*A63F 13/00* (2014.01)
*A63F 13/47* (2014.01)
(Continued)

(52) U.S. Cl.
CPC .............. *A63F 13/47* (2014.09); *A63F 13/12* (2013.01); *A63F 13/35* (2014.09);
(Continued)

(58) Field of Classification Search
CPC ............................ A63F 13/47; A63F 13/5252
See application file for complete search history.

(56) References Cited

U.S. PATENT DOCUMENTS 7,267,342 B2   9/2007   Myrfors
7,559,834 B1   7/2009   York
(Continued)

OTHER PUBLICATIONS

"Mighty Morphin Power Rangers", www.replacementdocs.com [retrieved Jun. 12, 2017], 4 pages.

*Primary Examiner* — David L Lewis
*Assistant Examiner* — Eric M Thomas
(74) *Attorney, Agent, or Firm* — Knobbe, Martens, Olson & Bear, LLP

(57) ABSTRACT

The disclosure relates to facilitating presentation of a combination of virtual units as a single entity during a battle in an online game. A user may be in control of and/or be associated with a first set of virtual units in the game space of the online game. Some of the virtual units of the user may be involved in a battle facilitated in the game space. A plurality of the virtual units controlled by and/or associated with the user may be combined as a single virtual entity, such that the plurality of virtual units is portrayed in the view of the game space of the online game as the single virtual entity. The attributes of the single virtual entity in the game space may be dictated by the collective set of attributes of the respective virtual units of the plurality of virtual units combined as the single virtual entity.

28 Claims, 4 Drawing Sheets

(51) Int. Cl.
  *A63F 13/30* (2014.01)
  *A63F 13/5252* (2014.01)
  *A63F 13/35* (2014.01)
  *A63F 13/537* (2014.01)
  *A63F 13/822* (2014.01)

(52) U.S. Cl.
  CPC ........ *A63F 13/5252* (2014.09); *A63F 13/537* (2014.09); *A63F 13/822* (2014.09)

(56) References Cited

U.S. PATENT DOCUMENTS

| | | |
|---|---|---|
| 7,955,175 B1 | 6/2011 | Holloway |
| 8,491,394 B2 | 7/2013 | Fields |
| 8,814,674 B2 | 8/2014 | Derome |
| 2003/0157985 A1* | 8/2003 | Shteyn .................... A63F 13/10 463/42 |
| 2006/0246974 A1 | 11/2006 | Tsuda |
| 2008/0200226 A1* | 8/2008 | Ichimura ................. A63F 13/10 463/8 |
| 2009/0061977 A1 | 3/2009 | Brandt |
| 2009/0149248 A1 | 6/2009 | Busey |
| 2013/0316829 A1* | 11/2013 | Derome .................... A63F 9/24 463/37 |

* cited by examiner

Fig. 2A

| 40 Virtual Units of User A | | |
|---|---|---|
| Identification | Attributes/Level | Combined |
| 1 | 1/1, 2/3, 3/1, 4/2 | A |
| 2 | 1/4, 2/1, 3/1 | |
| 3 | 1/2, 2/2, 3/2, 4/2, 5/1, 6/1, 7/1 | A |
| 4 | 3/1, 4/1, 7/2 | B |
| 5 | 2/3, 4/3 | B |
| 6 | 1/2, 4/1, 6/1 | A |
| 7 | 1/4 | |
| 8 | 2/2, 4/1, 6/2 | |

Fig. 2B

| 42 Virtual Entities of User A | |
|---|---|
| Identification | Attributes/Level |
| A | 1/5, 3/2, 6/1 |
| B | 4/4, 10/1 |

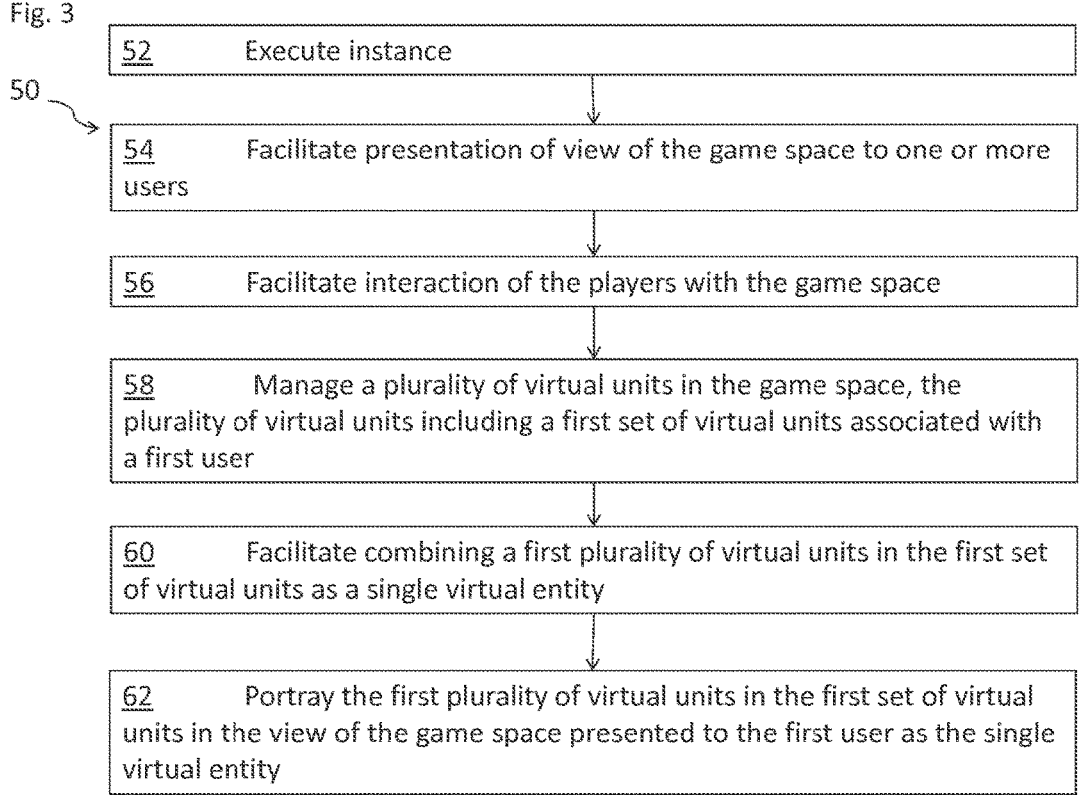

SYSTEM AND METHOD FOR COMBINING VIRTUAL UNITS IN A GAME

FIELD

The disclosure relates to facilitating a combination of multiple types of virtual units in a single march in an online game.

BACKGROUND

Various techniques for attacking another user's assets during play of an online game are known. For example, in a tower defense game, a user may send a set of virtual units controlled by the user to attack and/or destroy one or more virtual units, structures, and/or other assets of another user. Conventional systems restrict a set of virtual units that may be sent to attack another user to include virtual units of the same type. In that way, game logic of a conventional system may easily determine the consequence of an attack of the set of virtual entities. Conventional systems, however, fail to enable a user to select various types of virtual units to include in a single attack on another user's assets in a tower defense game. Conventional systems suffer from these and other drawbacks.

SUMMARY

One aspect of the disclosure relates to facilitating presentation of a combination of virtual units as a single entity during a battle in an online game. A user may be in control of and/or be associated with a first set of virtual units in the game space of the online game. At least some of the virtual units of the user may be involved in a battle facilitated in the game space. A plurality of the virtual units controlled by and/or associated with the user may be combined as a single virtual entity, such that the plurality of virtual units is portrayed in the view of the game space of the online game as the single virtual entity. The attributes of the single virtual entity in the game space may be dictated by the collective set of attributes of the respective virtual units of the plurality of virtual units combined as the single virtual entity.

A system configured to facilitate presenting a combination of virtual units as a single entity in an online game may include one or more processors configured to execute compute program modules. The program modules may comprise a game module, a virtual unit module, a battle module, a troop combination module, and/or other modules.

The game module may be configured to execute an instance of a game space. The game module may be configured to facilitate presentation of views of the game space to one or more users. The game module may be configured to facilitate interaction of the one or more users with the game space and/or each other by performing operations in the game space in response to commands received from the one or more users.

The virtual unit module may be configured to manage a plurality of virtual units in the game space. The plurality of virtual units may include, for example, a first set of virtual units controlled by or associated with a first user of the one or more users.

The battle module may be configured to facilitate a battle involving at least some individual virtual units of the first set of virtual units controlled by or associated with the first user.

The troop combination module may be configured to facilitate combining a first plurality of virtual units in the first set of virtual units as a single virtual entity. The game module may be configured such that the first plurality of virtual units in the first set of virtual units are portrayed in the view of the game space presented to the first user as the single virtual entity.

A computer-implemented method of presenting a combination of virtual units as a single entity in an online game may be implemented on a computer system that includes one or more physical processors. The method may comprise executing a game instance of a game space; facilitating presentation of views of the game space to one or more users; facilitating interaction of the one or more users with the game space and/or each other by performing operations in the game space in response to commands received from the one or more users, wherein the one or more users comprises a first user; managing a plurality of virtual units in the game space, wherein the plurality of virtual units include a first set of virtual units controlled by or associated with the first user; facilitating a battle involving at least some individual virtual units of the first set of virtual units; facilitating combining a first plurality of virtual units in the first set of virtual units as a single virtual entity; and portraying the first plurality of virtual units in the first set of virtual units in the view of the game space presented to the first user as the single virtual entity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A provides an exemplary illustration of information related to a set of virtual units associated with a user, according to various aspects of the invention.

FIG. 2B provides an exemplary illustration of information related to a set of virtual entities associated with a user, according to various aspects of the invention.

FIG. 3 illustrates an exemplary method of presenting a combination of virtual units as a single entity in an online game, according to various aspects of the invention.

DETAILED DESCRIPTION

Figure 1:
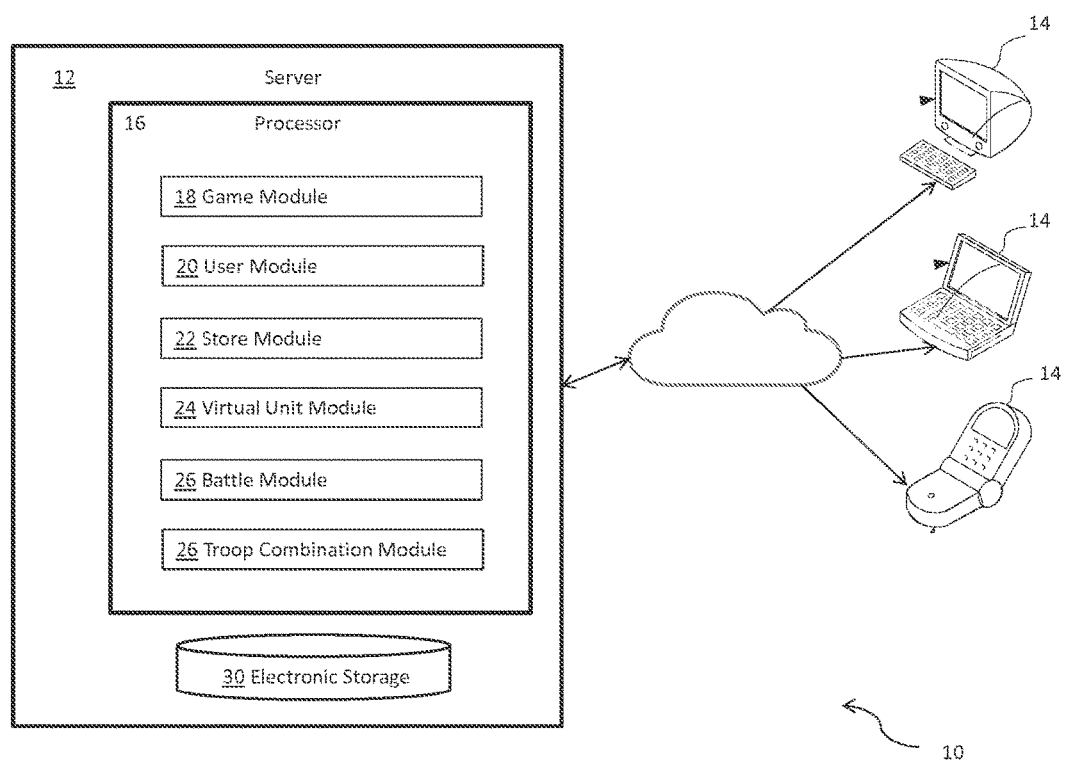
FIG. 1 provides an exemplary illustration of a system configured to facilitate presenting a combination of virtual units as a single entity in an online game, according to various aspects of the invention.

FIG. 1 provides an exemplary illustration of a system 10 configured to facilitate presenting a combination of virtual units as a single entity in an online game, according to various aspects of the invention. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program modules. The computer program modules may include one or more of a game module 18, a user module 20, a virtual unit module 22, a battle module 24, a troop combination module 26, and/or other modules.

The game module 18 may be configured to execute an instance of a game space. In some implementations, the game space may be a virtual space. As such, a game space may be an instance of the virtual space. A space module may be configured to implement the instance of the virtual space executed by the computer modules to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by and/or associated with a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

The above description of the manner in which state of the virtual space is determined by space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user.

The user may have an "inventory" of virtual assets, including, for example, virtual units, virtual entities, virtual currency, virtual items, and/or other virtual assets that are available for the user to use (e.g., by manipulation of a user character, other user controlled element, and/or other items) within the virtual space.

A virtual unit of the user may comprise, for example, a user-controlled element. A virtual unit may comprise one or more attributes associated with the user-controlled element, where an individual attribute may comprise a value associated with an individual level of one or more sequentially ordered levels of value for the individual attribute.

A virtual entity may comprise a combination of virtual units. The attributes of a virtual entity may be dictated, for example, by the collective attributes of the respective virtual units combined in the virtual entity. The virtual entity may have some or all of the attributes of the respective virtual units combined in the virtual entity.

In some implementations, responsive to a first virtual unit and a second virtual unit each comprising a first attribute, the virtual entity may comprise the first attribute. The first attribute may have a value that is the higher of the value associated with the first virtual unit and the second virtual unit, the lower of the value associated with the first virtual unit and the second virtual unit, the sum of the values associated with the first virtual unit and the second virtual unit, a difference between the values associated with the first virtual unit and the second virtual unit, the average of the value associated with the first virtual unit and the second virtual unit, and/or another value.

In some implementations, responsive to the collective attributes of the respective virtual units comprising a first attribute and a second attribute, the virtual entity may comprise a third attribute. The virtual entity may comprise the third attribute in lieu of comprising the first attribute and the second attribute. The third attribute may be an attribute that may only be available to a virtual entity, may be an attribute available to a virtual unit, may be an attribute available only after reaching a predetermined level of game play, may be an attribute available only after the user having reached a predetermined status, and/or be an attribute associated with other characteristics.

In some implementations, responsive to being combined as a virtual entity, the virtual units of the virtual entity may not be available for use within the virtual space separate from the virtual entity. In some implementations, the virtual units combined as the virtual entity may be presented via the views of the game to a user controlling the virtual entity as a single virtual entity instead of a combination of separate virtual units.

Virtual currency may be used by the user for expenditure within the virtual space. For example, virtual currency may be used to purchase items within the virtual space, to upgrade a virtual item of the user, to upgrade a virtual entity of the user, to upgrade a level of game play within the virtual space, and/or for other expenditures. In some implementations, virtually currency in an inventory of a user may also be measured to determine whether a user may be eligible for an upgrade, a bonus, and/or other award within the virtual space that takes into account an amount of virtual currency available to the user. Virtual currency may be acquired by a user through one or more of purchase for consideration having a real money value, gift, earned through gameplay, and/or acquired in other ways. Virtual currency may only be exchangeable as consideration in transactions within the game, and/or may be used or consumed outside of transactions.

A virtual item of the user may comprise, for example, a virtual object that may be used by the user within the virtual space. A virtual item may affect a virtual unit of the user, a virtual entity of the user, the virtual space in which the online game is played, game logic of the online game, an amount of virtual currency in the inventory of the user, and/or other components of the online game. Examples of virtual items include valuables (money, valuable metals or gems, etc.), weapons, spell components, defense components, armor. wood, stone, herbs, water, ores, animals, monsters, bosses, NPCs, building materials, potions, and/or other virtual objects.

FIG. 2A provides an exemplary illustration of information related to virtual units associated with and/or controlled by a user, according to various aspects of the invention. As shown in FIG. 2A, information related to a virtual unit may comprise, for example, an identification of the virtual unit, information related to one or more attributes of the virtual unit including an identification of an individual attribute and a value associated with the individual attribute, information related to whether the virtual unit has been combined with other virtual units as a virtual entity, and/or other information related to the virtual unit. The information related to whether the virtual unit has been combined may comprise, for example, an identification of a virtual entity into which the virtual unit has been combined.

FIG. 2B provides an exemplary illustration of information related to virtual entities associated with and/or controlled by a user, according to various aspects of the invention. As shown in FIG. 2A, information related to a virtual entity may comprise, for example, an identification of the virtual entity, information related to one or more virtual units associated with the virtual entity, and/or other information related to the virtual entity.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14.

Communications may be routed to and from the appropriate users through server 12 (e.g., through game module 18).

The user module 20 may be configured to access and/or manage one or more user accounts and/or user information associated with users of the system 10. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information related to an inventory of virtual units, virtual entities, virtual currency, virtual items, and/or other virtual assets of users, virtual space usage information, demographic information associated with users, interaction history among users in the virtual space, information stated by users, purchase information of users, browsing history of users, a client computing platform identification associated with a user, a phone number associated with a user, and/or other information related to users.

The user accounts may include at least a first user account for a first user. The first user account may comprise, for example, information related to an inventory of one or more virtual units under the control of and/or associated with the first user, one or more virtual entities under the control of and/or associated with the first user, and/or other virtual assets of the first user. In some implementations, the game module 18 may be configured such that a first set of virtual units combined as a single first virtual entity may be portrayed in the view of the game space as a single first virtual entity to a user controlling and/or associated with the first set of virtual units.

Store module 22 may be configured to present a store interface to the users of the game space. The store interface may present offers to users to purchase one or more of a plurality of virtual units, virtual entities, virtual items, and/or other virtual assets. The store module 22 may enable a user to purchase a virtual unit, a virtual entity, a virtual item, and/or other virtual assets for respective associated costs. In some implementations, a cost associated with a virtual entity may be less than an aggregated cost associated with each of the individual virtual units to be combined as the virtual entity. In some implementations, a virtual entity may be available via the store interface that may not be available by combination of a plurality of virtual units available via the store interface. In some implementations, the cost for a virtual entity may comprise the surrender by the user of one or more virtual units of the user.

In some implementations, a virtual unit and/or virtual entity may be obtained by a user by purchasing the virtual unit and/or virtual entity via the store interface presented by the store module 22. In some implementations, a virtual unit and/or virtual entity may be obtained by a user during game play. For example, a user may obtain virtual unit and/or virtual entity as a prize in the game. The user may obtain a virtual unit and/or virtual entity for achieving a subsequent level in game play. In some examples, the user may obtain a virtual unit and/or virtual entity for achieving the subsequent level in game play while maintaining a predetermined level of virtual assets. In another example, the user may obtain a virtual unit and/or virtual entity based on a relationship, affiliation, and/or other association of the user in the game space. In yet another example, the user may obtain a virtual unit and/or virtual entity as a bonus item after purchasing a predetermined number of items and/or spending a predetermined amount of virtual currency via the store interface presented by the store module 22. In another example, the user may obtain a virtual unit and/or virtual entity based on the game logic of the online game. Other ways of obtaining a virtual unit and/or virtual entity may be available to the user as well.

The virtual unit module 24 may be configured to manage a plurality of virtual units in the game space. The plurality of virtual units may include, for example, include troops, drones, medical units, mechanical repair units, or other virtual units controlled by or associated with a user. The plurality of virtual units may include, for example, a first set of virtual units controlled by or associated with a first user of the one or more users. In some implementations, the plurality of virtual units may include the first set of virtual units, a second set of virtual units controlled by or associated with a second user of the one or more users, and/or other sets of virtual units. The plurality of virtual units may include virtual units of one or more types.

The battle module 26 may be configured to facilitate a battle involving at least some individual virtual units of the first set of virtual units controlled by or associated with the first user. In some implementations, battle module 26 may facilitate attacks by virtual units on one another, structures of the game space, or other elements in the game space. For example, battle module 26 may facilitate attacks by game-controlled units on one or more virtual units of a user to inflict damage on the virtual units of the user. The virtual units of the user may prevent an attack by game-controlled units and/or may inflict damage on the game-controlled units. In another example, battle module 26 may facilitate attacks by one or more virtual units of a second user on one or more virtual units of a user to inflict damage on the virtual units of the first user. The virtual units of the first user may prevent an attack by virtual units of the second user and/or may inflict damage on the virtual units of the second user. The battle module 26 may enable a user to direct one or more virtual units to participate in a battle by selecting the one or more virtual units and directing the one or more virtual units to participate in the battle.

The troop combination module 28 may be configured to facilitate combining a first plurality of virtual units in the first set of virtual units as a single virtual entity. The game module 18 may be configured such that the first plurality of virtual units in the first set of virtual units are portrayed in the view of the game space presented to the first user as the single virtual entity. In some implementations, the first plurality of virtual units may include individual virtual units of a first unit type. The game module 18 may be configured to portray the individual virtual units of the first unit type as the single virtual entity. The first plurality of virtual units may include a first set of virtual units of a first unit type and a second set of virtual units of a second unit type. The game module 18 may be configured to depict the single virtual entity in a manner that indicates one or more of the respective unit types included in the single virtual entity. For example, the game module 18 may depict the single virtual entity portray in a manner that indicates the first unit type. In another example, the game module 18 may depict the single virtual entity in a manner that indicates the first unit type and the second unit type. In another example, the game module 18 may be configured to portray at least one virtual unit of each respective type as the single virtual entity. The indication of unit type with the single virtual entity may be dictated by the proportion of virtual units of respective type, may be dictated by the user, may be dictated by the game logic of the online game, and/or may otherwise be dictated.

In some implementations, the troop combination module 28 may be configured to receive instructions from the user to combine one or more virtual units as a single virtual entity. For example, the instruction may indicate individual virtual units of a first plurality of virtual units of the user to combine as the single virtual entity. The troop combination module 28 may be configured to combine the individual virtual units of the first plurality of virtual units as the single virtual entity responsive to receiving the instructions.

In some implementations, the troop combination module 28 may be configured to provide a first estimated amount of damage in a battle based on the collective set of attributes of the single virtual entity. In some implementations, the troop combination module 28 may be configured to a recommendation to the user that indicates individual virtual units to include in the first plurality of virtual units to be combined as a single virtual entity. In some implementations, the troop combination module 28 may be configured to provide the recommendation based on a determination of estimated damage of different configurations of individual virtual units combined as a single virtual unit. For example, the troop combination module 28 may be configured to determine a first estimated amount of damage in the battle for a first configuration of individual virtual units of the user's set of virtual units, determine a second estimated amount of damage in the battle for a second configuration of individual virtual units of the user's set of virtual units, the first configuration being different from the second configuration, and/or determine other estimated amounts of damage for other configurations of individual virtual units of the user's set of virtual units. Responsive to a first estimated amount of damage being greater than the second estimated amount of damage (and/or other estimated amounts of damage), the troop combination module 28 may be configured to provide the recommendation indicating the first configuration of individual virtual units to the user as the individual virtual units to include as the single virtual entity.

The troop combination module 28 may be configured to facilitate combination of a second set of virtual units of the user's set of virtual units as a second virtual entity. The game module 18 may be configured to configure the second set of virtual units as the second single virtual entity in the virtual space. The second set of virtual units (and/or the second single virtual entity) may be different from the first set of virtual units (and/or the first single virtual entity). For example, the first set of virtual units may comprise a first number of virtual units and the second set of virtual units may comprise a second number of virtual units. The second number may be different from the first number. In another example, the first set of virtual units may include a first number of individual virtual units of a first type and the second set of virtual units include a second number of individual virtual units of the first type, wherein the second number is different from the first number. In another example, the first set of virtual units may include individual virtual units of a set of first unit types, the set of first unit types comprising one or more unit types, and the second set of virtual units may include individual virtual units of a set of second unit types, the set of second unit types comprising different unit types than the set of first unit types. In some implementations, each virtual entity of the user may comprise a different set of virtual units.

In some implementations, the server 12, client computing platforms 14, and/or other components of the system 10 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or other components of the system 10 may be operatively linked via some other communication media.

A given client computing platform 14 may include one or more processors configured to execute computer program modules. The computer program modules may be configured to enable an expert or user associated with the given client computing platform 14 to interface with system 10 and/or other components of the system 10, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 30, one or more processors 16, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14 and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, and/or other modules. Processor 16 may be configured to execute modules 18, 20, 22, 24, 26, 28, and/or other modules by software; hardware; firmware; some combination of software, hardware, and/or firmware; and/or other mechanisms for configuring processing capabilities on processor 16.

It should be appreciated that although modules 18, 20, 22, 24, 26, 28, and/or other modules are illustrated in FIG. 1 as being co-located within a single processing unit, in implementations in which processor 16 includes multiple processing units, one or more of modules 18, 20, 22, 24, 26, 28, and/or other modules may be located remotely from the other modules. The description of the functionality provided by the different modules 18, 20, 22, 24, 26, 28, and/or other modules described below is for illustrative purposes, and is not intended to be limiting, as any of modules 18, 20, 22, 24, 26, 28, and/or other modules may provide more or less functionality than is described. For example, one or more of modules 18, 20, 22, 24, 26, 28, and/or other modules may be eliminated, and some or all of its functionality may be provided by other ones of modules 18, 20, 22, 24, 26, 28, and/or other modules. As another example, processor 16 may be configured to execute one or more additional modules that may perform some or all of the functionality attributed below to one of modules 18, 20, 22, 24, 26, 28, and/or other modules.

FIG. 3 illustrates a method 50 of facilitating provision of multilevel upgrade items to one or more users of an online game, according to various aspects of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game module the same as or similar to game module 18 (shown in FIG. 1 and described above).

At an operation 54, views of the game space may be presented to one or more users. The views may be presented to users via client computing platforms. In some implementations, operation 54 may be performed by a game module the same as or similar to game module 18 (shown in FIG. 1 and described above).

At an operation 56, interaction of the one or more users with the game space and/or each other may be facilitated. The interaction may be facilitated in response to commands received from the one or more users. In some implementations, operation 56 may be performed by a user module the same as or similar to user module 18 (shown in FIG. 2 and described herein).

At operation 58, a plurality of virtual units in the game space may be managed. The plurality of virtual units may include a first set of virtual units controlled by and/or associated with a first user of the one or more users. In some implementations, operation 58 may be performed by a virtual unit module the same as or similar to virtual unit module 24 (shown in FIG. 1 and described herein).

At an operation 60, a battle involving at least some of the virtual units of the first set of virtual units may be facilitated. In some implementations, operation 60 may be performed by a battle module the same as or similar to battle module 26 (shown in FIG. 1 and described herein).

At an operation 60, a combination of a first plurality of virtual units in the first set of virtual units as a single virtual unit entity may be facilitated. In some implementations, operation 60 may be performed by a troop combination module the same as or similar to troop combination module 28 (shown in FIG. 1 and described herein).

At an operation 62, the first plurality of virtual units in the first set of virtual units may be portrayed in the view of the game space presented to the first user as the single virtual entity. In some implementations, operation 60 may be performed by a game module the same as or similar to game module 18 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system comprising:
   one or more processors configured by machine-readable instructions to:
   execute a game instance of a game space, and to use the game instance to generate game state information that is transmitted to client computing platforms over a network, the game state information facilitating presentation of views of the game space to one or more users via the client computing platforms, wherein execution of the game instance includes performing operations in the game space in response to commands received over the network from the client computing platforms associated with the one or more users and wherein the one or more users comprises a first user, wherein virtual units in the game space include a first set of virtual units controlled by or associated with the first user;
   combine multiple virtual units in the first set of virtual units as a single virtual entity; and
   cause presentation of a view of the game space wherein the multiple virtual units in the first set of virtual units are represented in the view of the game space presented to the first user as the single virtual entity, such that the single virtual entity is presented to the first user and controllable by the first user as an individual visual entity instead of multiple visually separate virtual units displayed together or overlapping spatially, the single virtual entity having a set of attributes determined based at least in part on individual attributes of the multiple virtual units.

2. The system of claim 1, wherein the multiple virtual units include individual virtual units of a first unit type.

3. The system of claim 2, wherein the single virtual entity is represented in the view of the game space in a manner that indicates the first unit type.

4. The system of claim 2, wherein the multiple virtual units include individual virtual units of a second unit type, and wherein a representation of the single virtual entity in the view of the game space includes representations of at least one of the virtual units of the first unit type and at least one of the virtual units of the second unit type.

5. The system of claim 4, wherein the single virtual entity is depicted in a manner that indicates different unit types.

6. The system of claim 1, wherein the single virtual entity comprises a collective set of attributes, wherein the collective set of attributes are dictated by the respective attributes of individual ones of the multiple virtual units combined as the single virtual entity.

7. The system of claim 6, wherein the one or more processors are configured by machine readable instructions to: provide a first estimated amount of damage based on the collective set of attributes of the single virtual entity.

8. The system of claim 1, wherein the one or more processors are configured by machine-readable instructions to:
   receive instructions from the first user, the instructions indicating individual virtual units as the multiple virtual units in the first set of virtual units to be combined; and
   wherein the individual virtual units indicated as the multiple virtual units are combined as the single virtual entity responsive to the instructions.

9. The system of claim 1, wherein the one or more processors are configured by machine-readable instructions to:
   provide a recommendation to the first user, the recommendation indicating individual ones of the virtual units in the first set of virtual units to be combined as the single virtual entity.

10. The system of claim 9, wherein the one or more processors are configured by machine-readable instructions to provide the recommendation by:
    determining a first estimated amount of damage for a first configuration of individual virtual units of the first set of virtual units;
    determining a second estimated amount of damage for a second configuration of individual virtual units of the first set of virtual units, the first configuration being different from the second configuration; and
    responsive to the first estimated amount of damage being greater than the second estimated amount of damage, providing the recommendation indicating the first configuration of individual virtual units as the individual virtual units to include in the multiple virtual units to be combined as the single virtual entity.

11. The system of claim 1, wherein the multiple virtual units combined as the single virtual entity include a first group of multiple virtual units and wherein the one or more processors are configured by machine-readable instructions to facilitate combining a second group of multiple virtual units in the first set of virtual units as a second single virtual entity, and wherein the second group of multiple virtual units in the first set of virtual units are portrayed in the view of the game space presented to the first user as the second single virtual entity, such that the second single virtual entity is presented to the first user and controllable by the first user as an individual entity instead of multiple separate virtual units displayed together, the second single virtual entity having a second set of attributes dictated by the second group of multiple virtual units combined, such that individual attributes of the second group of multiple virtual units are combined in the second set of attributes for the second single virtual entity, wherein the second group of multiple virtual units is different from the first group of multiple virtual units combined as the single virtual entity.

12. The system of claim 11, wherein the first group of multiple virtual units to be combined as the single virtual entity comprises a first number of virtual units and the second group of multiple virtual units to be combined as the second single virtual entity comprises a second number of virtual units different from the first number.

13. The system of claim 11, wherein the first group of multiple virtual units to be combined as the single virtual entity includes a first number of individual virtual units of a first type and the second group of multiple virtual units to be combined as the second single virtual entity includes a second number of individual virtual units of the first type, wherein the second number is different from the first number.

14. The system of claim 11, wherein the first group of multiple virtual units to be combined as the single virtual entity includes individual virtual units of a set of first unit types, the set of first unit types comprising one or more unit types, and the second group of multiple virtual units to be combined as the second single virtual entity includes individual virtual units of a set of second unit types, the set of second unit types comprising different unit types than the set of first unit types.

15. A computer-implemented method implemented on a computer system that includes one or more physical processors, the method comprising:
    executing a game instance of a game space;
    using the game instance to generate game state information that is transmitted to client computing platforms over a network;
    using the game state information to facilitate presentation of views of the game space to one or more users via the computing platforms;
    facilitating interaction of the one or more users with the game space by performing operations in the game space in response to commands received over the network from the client computing platforms associated with the one or more users, wherein the one or more users comprises a first user;
    managing virtual units in the game space, wherein the virtual units include a first set of virtual units controlled by or associated with the first user;
    combining multiple virtual units in the first set of virtual units as a single virtual entity; and
    causing presentation of a view of the game space wherein the multiple virtual units in the first set of virtual units are represented in the view of the game space presented to the first user as the single virtual entity, such that the single virtual entity is presented to the first user and controllable by the first user as an individual visual entity instead of multiple visually separate virtual units displayed together or overlapping spatially, the single virtual entity having a set of attributes determined based at least in part on individual attributes of the multiple virtual units.

16. The method of claim 15, wherein the multiple virtual units include individual virtual units of a first unit type.

17. The method of claim 16, wherein the single virtual entity is represented in the view of the game space in a manner that indicates the first unit type.

18. The method of claim 16, wherein the multiple virtual units include individual virtual units of a second unit type, and wherein a representation of the single virtual entity in the view of the game space includes representations of at least one of the virtual units of the first unit type and at least one of the virtual units of the second unit type.

19. The method of claim 18, wherein the single virtual entity is depicted in a manner that indicates different unit types.

20. The method of claim 15, wherein the single virtual entity comprises a collective set of attributes, the collective set of attributes comprising the respective attributes of individual ones of the multiple virtual units combined as the single virtual entity.

21. The method of claim 20, further comprising:
    providing a first estimated amount of damage based on the collective set of attributes of the single virtual entity.

22. The method of claim 15, further comprising:
    receiving instructions from the first user, the instructions indicating individual virtual units as the multiple virtual units in the first set of virtual units; and
    wherein the individual virtual units indicated as the multiple virtual units are combined as the single virtual entity responsive to the instructions.

23. The method of claim 15, further comprising:
    providing a recommendation to the first user, the recommendation indicating individual ones of the virtual units in the first set of virtual units to be combined as the single virtual entity.

24. The method of claim 23, wherein providing the recommendation comprises:
    determining a first estimated amount of damage for a first configuration of individual virtual units of the first set of virtual units;
    determining a second estimated amount of damage for a second configuration of individual virtual units of the first set of virtual units, the first configuration being different from the second configuration; and
    responsive to the first estimated amount of damage being greater than the second estimated amount of damage, providing the recommendation indicating the first configuration of individual virtual units as the individual virtual units to include in the multiple virtual units.

25. The method of claim 15, further comprising:
    facilitating combining a second group of multiple virtual units in the first set of virtual units as a second single virtual entity, and wherein the second group of multiple virtual units in the first set of virtual units are portrayed in the view of the game space presented to the first user as the second single virtual entity, such that the second single virtual entity is presented to the first user and controllable by the first user as an individual entity instead of multiple separate virtual units displayed together, the second single virtual entity having a second set of attributes dictated by the second group of multiple virtual units combined, such that individual attributes of the second group of multiple virtual units are combined in the second set of attributes for the second single virtual entity, wherein the second group of multiple virtual units is different from the first group of multiple virtual units combined as the single virtual entity.

26. The method of claim 25, wherein the first group of multiple virtual units to be combined as the single virtual entity comprises a first number of virtual units and the second group of multiple virtual units to be combined as the second single virtual entity comprises a second number of virtual units different from the first number.

27. The method of claim 25, wherein the first group of multiple virtual units to be combined as the single virtual entity includes a first number of individual virtual units of a first type and the second group of multiple virtual units includes a second number of individual virtual units of the first type, wherein the second number is different from the first number.

28. The method of claim 25, wherein the first group of multiple virtual units to be combined as the single virtual entity includes individual virtual units of a set of first unit types, the set of first unit types comprising one or more unit types, and the second group of multiple virtual units to be combined as the single virtual entity includes individual virtual units of a set of second unit types, the set of second unit types comprising different unit types than the set of first unit types.

* * * * *